United States Patent
Kolb (10) Patent No.: US 11,604,168 B2
(45) Date of Patent: Mar. 14, 2023

(54) FENESTRATION UNIT DEMONSTRATION METHODS AND SYSTEMS

(71) Applicant: Pella Corporation, Pella, IA (US)

(72) Inventor: Brian L. Kolb, Pella, IA (US)

(*) Notice: Subject to any disclaimer, the term of this patent is extended or adjusted under 35 U.S.C. 154(b) by 214 days.

(21) Appl. No.: 16/701,202

(22) Filed: Dec. 3, 2019

(65) Prior Publication Data
US 2021/0164942 A1 Jun. 3, 2021

(51) Int. Cl.
| G01N 29/02 | (2006.01) |
| G01N 29/024 | (2006.01) |
| G01M 99/00 | (2011.01) |
| G01N 29/44 | (2006.01) |
| G01H 17/00 | (2006.01) |

(52) U.S. Cl.
CPC .......... *G01N 29/024* (2013.01); *G01H 17/00* (2013.01); *G01M 99/001* (2013.01); *G01N 29/4427* (2013.01)

(58) Field of Classification Search
CPC .... G01N 29/024; G01H 17/00; G01M 99/001
See application file for complete search history.

(56) References Cited

U.S. PATENT DOCUMENTS

| 4,023,156 A * | 5/1977 | Galvin .................. G08B 13/04 340/550 |
| 4,644,794 A * | 2/1987 | Vaicaitis ................. G01H 3/00 73/583 |
| 7,237,676 B2 | 7/2007 | Celia |
| 7,979,374 B2 | 7/2011 | Landvik |
| 8,682,735 B2 | 3/2014 | Ebrom et al. |
| 9,836,781 B2 | 12/2017 | Potucek et al. |
| 2006/0230834 A1* | 10/2006 | Liu ...................... G01N 29/022 73/649 |
| 2019/0174936 A1 | 6/2019 | Bender et al. |

FOREIGN PATENT DOCUMENTS

WO 2017/172916 A1 10/2017

* cited by examiner

*Primary Examiner* — Tarun Sinha
(74) *Attorney, Agent, or Firm* — Faegre Drinker Biddle & Reath; Jonathan Webb; Victor Jonas (57) ABSTRACT

Various systems and methods for demonstrating acoustic properties of a fenestration unit are provided herein. A system includes a sound demonstration apparatus having a sound insulating member defining an acoustic chamber, wherein the sound demonstration apparatus includes at least one open face. The system also includes a sound emitter operable to be positioned in the acoustic chamber of the sound demonstration apparatus, wherein the sound demonstration apparatus is operable to engage the fenestration unit at the open face of the sound demonstration apparatus. The method includes positioning the sound demonstration apparatus and a fenestration unit, such that the fenestration unit and the sound demonstration apparatus are operably engaged and form an acoustic chamber. The method includes activating a sound emitter.

26 Claims, 8 Drawing Sheets

FENESTRATION UNIT DEMONSTRATION METHODS AND SYSTEMS

CROSS-REFERENCE TO RELATED APPLICATION

Not applicable.

TECHNICAL FIELD

The present invention relates to demonstration systems and methods for providing users and customers with examples of acoustic and sound transfer properties of fenestration units.

BACKGROUND

Basic window assemblies traditionally include a frame (the framework that surrounds and supports the entire window system, comprised of the head, jamb and sill) and one or more sashes (a fixed or moveable part of a window made up of the vertical and horizontal frame that holds the glazing, or glass panels). Windows or other fenestration units may include multiple glazing panels. These units may include two or more sheets, or panes of glazing separated by one or more spacers with sealed space(s) between the two or more sheets of glazing. The glazing is assembled to the sash to provide a fixed or venting (e.g., sliding, such as double hung or hinged, such as casement) arrangement. Though insulative properties are typically demonstrable and appreciable by consumers, it may be difficult or impractical to convey (e.g., to a customer for sales or marketing purposes, or to another person) the acoustic properties of fenestration units.

SUMMARY

Various aspects of the present disclosure are directed toward apparatuses, systems, and methods that relate to improved insulating glass/access assemblies for fenestration units, including windows and doors.

According to one example (Example 1), a method of demonstrating acoustic properties of a fenestration unit is provided, the method comprising arranging a fenestration unit with a sound demonstration apparatus having a sound emitter and a sound insulating member substantially surrounding the sound emitter such that the fenestration unit is engaged with the sound insulating member and exposed to sound waves emitted from the sound emitter, and activating the sound emitter to produce sound waves such that the sound waves are directed toward the fenestration unit.

According to another example (Example 2), the method of Example 1, further comprises altering the level of sound passing through the fenestration unit by opening or closing the fenestration unit.

According to another example (Example 3), the method of Example 1 includes that the sound emitter is a speaker or tuning forks and activating the sound demonstration apparatus includes activating the speaker or tuning forks of the sound demonstration unit.

According to another example (Example 4), the method of Example 3 includes that activating the speaker or tuning forks includes emitting sound waves at predetermined frequencies.

According to another example (Example 5), the method of Example 3 includes that activating the speaker includes emitting sound waves imitating one or more of road traffic, pedestrian traffic, air traffic, music, construction, yard care, weather events, nature sounds, or combinations thereof.

According to another example (Example 6), the method of Example 1 includes that activating the sound demonstration apparatus includes operating the sound emitter using a wireless controller.

According to another example (Example 7), the method of Example 1 further comprises activating the sound emitter of the sound demonstration apparatus prior to arranging the fenestration unit with the sound demonstration apparatus.

According to another example (Example 8), the method of Example 1 further comprises activating the sound emitter of the sound demonstration apparatus when the fenestration unit is in the open position.

According to one example (Example 9) a method of demonstrating acoustic properties of a fenestration unit is provided, the method comprising positioning a sound demonstration apparatus and a fenestration unit such that the sound demonstration apparatus is operatively engaged with the fenestration unit such that sound emitted from the sound demonstration apparatus is directed toward the fenestration unit, forming an acoustic seal between the sound demonstration apparatus and the fenestration unit, and activating the sound demonstration apparatus such that the sound demonstration apparatus emits sound waves.

According to another example (Example 10), the method of Example 9 further comprises disrupting the acoustic seal between the sound demonstration apparatus and the fenestration unit.

According to another example (Example 11), the method of Example 9 includes that positioning the sound demonstration apparatus and the fenestration unit includes arranging the fenestration unit horizontally over the sound demonstration unit.

According to another example (Example 12), the method of Example 9 includes that activating the sound demonstration apparatus includes activating a sound emitter of the sound demonstration unit.

According to another example (Example 13), the method of Example 12 includes that activating the sound emitter includes emitting sound waves at predetermined frequencies.

According to another example (Example 14), the method of Example 12 includes that activating the sound emitter includes emitting sound waves imitating one or more of road traffic, pedestrian traffic, air traffic, music, construction, yard care, weather events, nature sounds, or combinations thereof.

According to another example (Example 15), the method of Example 9 includes that activating the sound demonstration includes operating the sound emitter using a wireless controller.

According to another example (Example 16), the method of Example 9 further comprises activating the sound emitter of the sound demonstration apparatus prior to positioning the sound demonstration apparatus and the fenestration unit.

According to another example (Example 17), the method of Example 9 further comprises reducing sound waves emanating from closed faces of the sound demonstration apparatus by providing sound insulation to the closed faces of the sound demonstration apparatus.

According to one example (Example 18) a method of demonstrating acoustic properties of a fenestration unit is provided, the method comprising arranging a sound emitter on an acoustically non-transmissive surface, activating the sound emitter, and placing the fenestration unit over the sound emitter such that the sound emitter is enclosed by the fenestration unit and the acoustically non-transmissive surface.

According to another example (Example 19), the method of Example 18 further comprises altering the level of sound passing through the fenestration unit by opening or closing the fenestration unit.

According to another example (Example 20), the method of Example 18 includes that arranging the fenestration unit over the sound emitter includes laying the fenestration unit horizontally over the sound source position on a ground surface including an acoustically non-transmissive surface comprising carpet.

According to one example (Example 21) a method of demonstrating acoustic principles of a fenestration unit is provided, the method comprising displaying a fenestration unit having at least a first glass panel and a second glass panel, wherein the first glass panel has a first thickness and the second glass panel has a second thickness defining a glass thickness ratio of the first glass panel relative to the second glass panel, and wherein the first panel is thinner relative to the second panel, striking a first, unmodified tuning fork; and striking a second, modified tuning fork having a first tine and a second tine, wherein the second, modified tuning fork is modified to have a tine thickness ratio equal to the glass thickness ratio, and wherein the tine thickness ratio is defined by a first tine thickness of the first tine relative to a second tine thickness of the second tine.

According to one example (Example 22) a system for demonstrating acoustic properties of a fenestration unit is provided, the system comprising a sound demonstration apparatus including a sound insulating member defining an acoustic chamber, wherein the sound demonstration apparatus includes at least one open face, and a sound emitter operable to be positioned in the acoustic chamber of the sound demonstration apparatus, wherein the sound demonstration apparatus is operable to engage the fenestration unit at the open face of the sound demonstration apparatus.

According to another example (Example 23), the sound demonstration apparatus of Example 22 further comprises a receiving surface operable to form an acoustic seal with the fenestration unit.

According to another example (Example 24), the sound demonstration apparatus of Example 23 includes that the receiving surface of the sound demonstration apparatus is operable to abut a glass panel of the fenestration unit.

According to another example (Example 25), the sound demonstration apparatus of Example 23 includes that the receiving surface of the sound demonstration apparatus is operable to engage with a frame of the fenestration unit.

According to another example (Example 26), the sound demonstration apparatus of Example 22 includes that the sound emitter includes a speaker.

The foregoing Examples are just that and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

It should be understood that the drawings are intended to facilitate understanding of exemplary embodiments of the present invention are not necessarily to scale.

DETAILED DESCRIPTION

The following description refers to the accompanying drawings which show specific embodiments. Although specific embodiments are shown and described, it is to be understood that additional or alternative features are employed in other embodiments. The following detailed description is not to be taken in a limiting sense, and the scope of the claimed invention is defined by the appended claims and their equivalents.

It should be understood that like reference numerals are intended to identify the same structural components, elements, portions, or surfaces consistently throughout the several drawing figures, as such components, elements, portions, or surfaces may be further described or explained by the entire written specification, of which this detailed description is an integral part. Unless otherwise indicated, the drawings are intended to be read (for example, cross-hatching, arrangement of parts, proportion, degree, etc.) together with the specification, and are to be considered a portion of the written description.

This disclosure is not meant to be read in a restrictive manner. For example, the terminology used in the application should be read broadly in the context of the meaning those in the field would attribute such terminology.

With respect terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

Certain terminology is used herein for convenience only. For example, words such as "top", "bottom", "upper," "lower," "left," "right," "horizontal," "vertical," "upward," and "downward" merely describe the configuration shown in the figures or the relative orientation of parts for ease of description. Indeed, unless context dictates otherwise, referenced components may be oriented in any coordinate direction. Similarly, throughout this disclosure, where a process or method is shown or described, the method may be performed in any order or simultaneously, unless it is clear from the context that the method requires that certain actions be performed in certain order.

Descriptions of the Various Embodiments

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale but may be exaggerated to illustrate various aspects of the present disclosure, and in that regard, the drawing figures should not be construed as limiting.

Various examples relate to demonstrating and assessing the acoustic performance of fenestration units in a variety of contexts, including sales, research and development, and other contexts. In some examples, a test unit, also describe as a demonstration unit, is employed to provide a relative assessment of the acoustic performance (sound blocking performance) of a fenestration unit. It will be understood that term "demonstrate" (and equivalent terms such as "demonstration" and "demonstrating") is to be broadly understood to include exhibit, showcase, advertise, assess, determine, gauge, test, analyze, check, confirm, investigate, prove, validate, establish, verify, evidence, show, communicate, display, and convey (and their derivatives), as appropriate.

Some examples relate to system components and associated methods for demonstrating the sound qualities and properties of fenestration units. Though an exemplary fenestration unit is described in various examples it should be understood that similar principles apply to any of a variety of fenestration units, including any type of window, door, or other unit.

Figure 1:
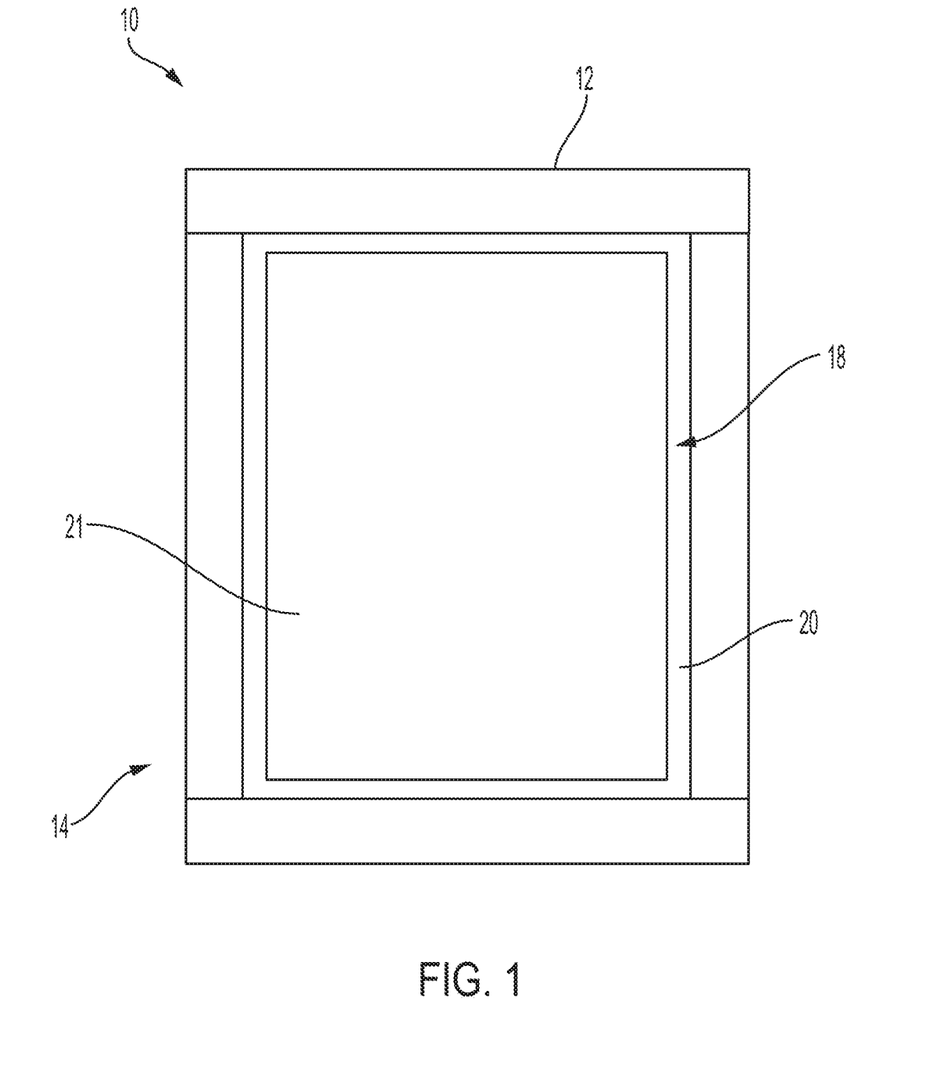
FIG. 1 is a view of a fenestration unit according to an embodiment.

FIG. 1 is a front view of a fenestration unit 10, in accordance with some embodiments. The fenestration unit 10 generally includes a frame 12 and has an interior side 14 and an exterior side 16 (not shown) opposite the interior side. The interior side 14 can be arranged, for example, toward an interior of a building or room and the exterior side 16 can be arranged toward an exterior of a building or room. In some embodiments, the fenestration unit 10 also includes a sash assembly 18 which may be fixed, or stationary, or venting/actuatable. The examples provided herein are not to be construed as limiting to a specific embodiments of fenestration units, but are to be broadly understood to include any fenestration unit or the likes. The examples of fenestration units that are shown and that will be discussed hereafter are merely examples are not construed as limiting. For example, the sash assembly 18 may include a primary sash 20. In some embodiments the sash assembly further includes a secondary sash 22 coupled to the primary sash 20.

Figure 2:
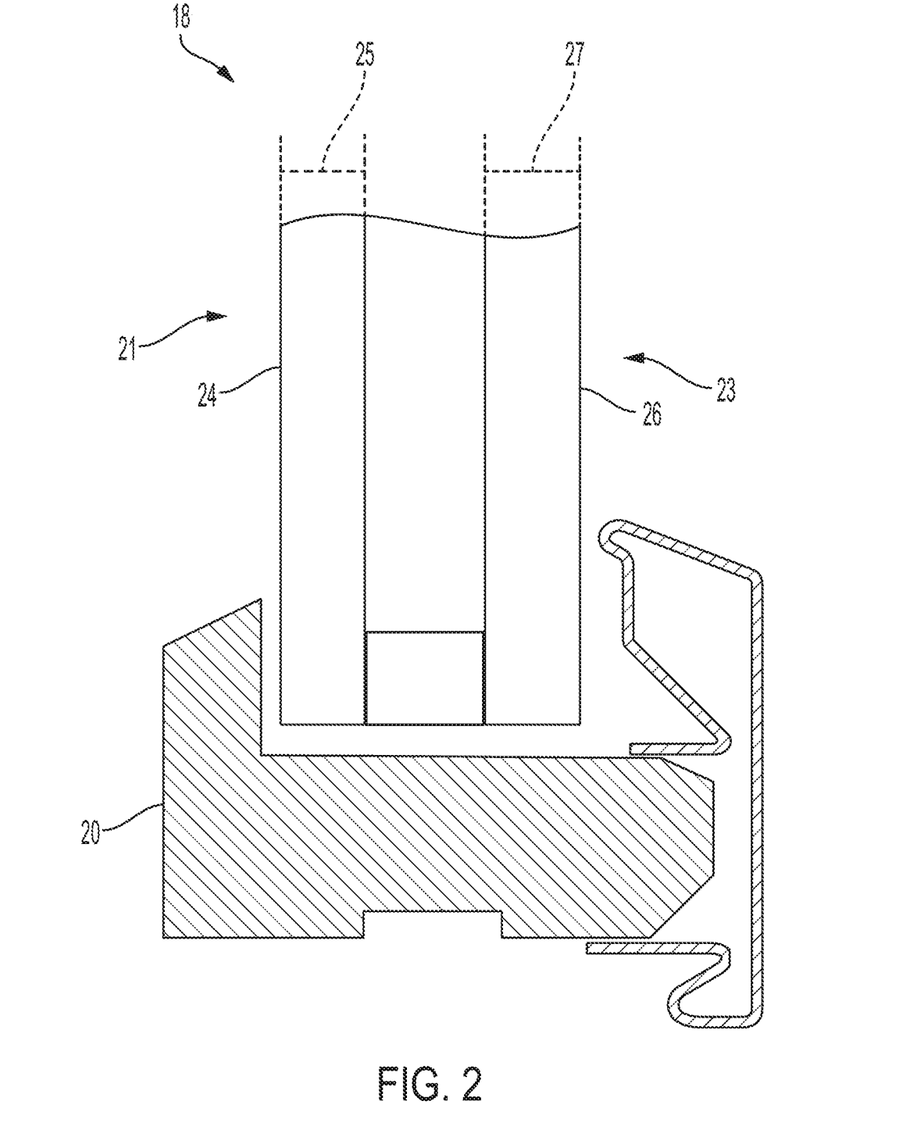
FIG. 2 is a sectional view of a sash assembly having primary and secondary glazing, according to an embodiment.
Figure 3:
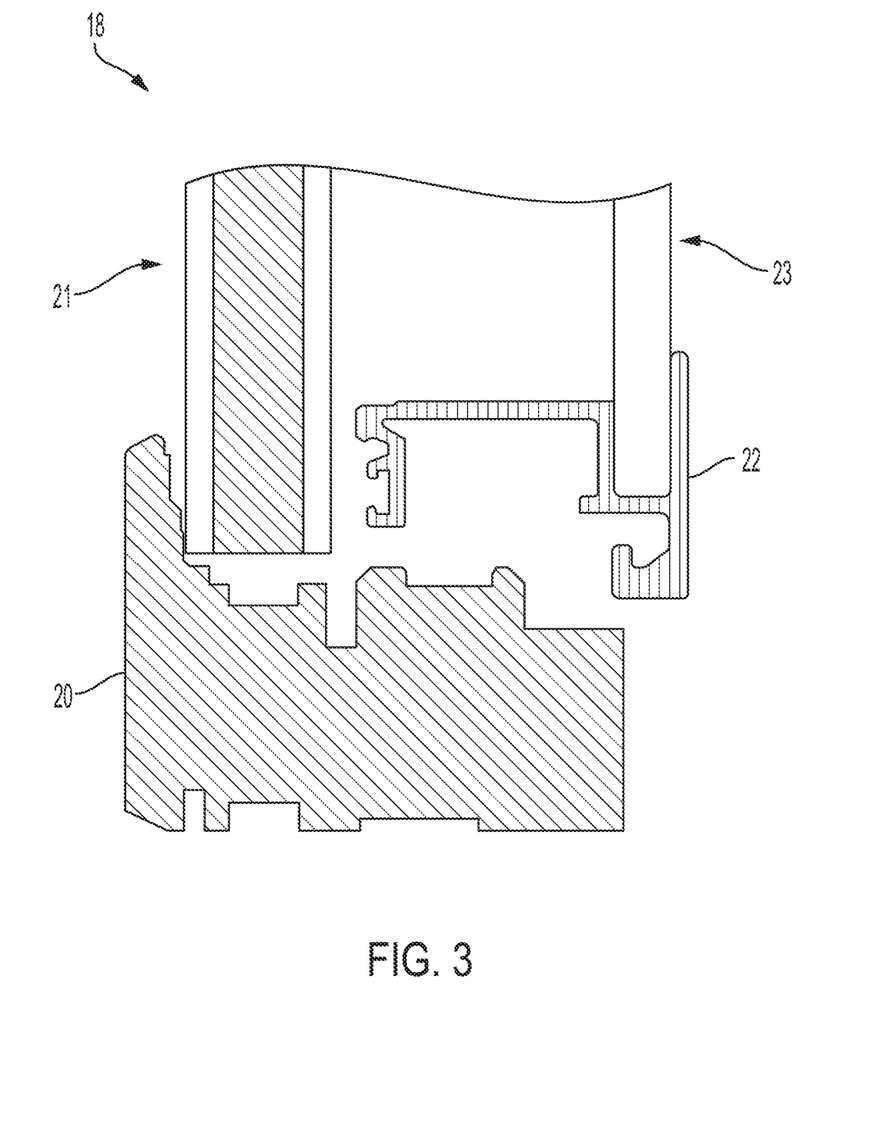
FIG. 3 is a sectional view of an alternative sash assembly, according to an embodiment.

Referring to FIGS. 1 and 2, in one non-limiting example, the primary sash 20 may support primary glazing 21 and secondary glazing 23. As seen in FIG. 3, in other embodiments the sash assembly 18 may include a primary sash 20 may support primary glazing 21 and a secondary sash 22 may support secondary glazing 23. One or more of the primary and secondary glazing 21, 23 may be transparent, translucent, opaque and combinations thereof. In various examples, the primary and secondary glazing 21, 23 include clear, transparent glass. It will be understood that any number of types, configurations, and so forth relating to fenestration units are contemplated within this disclosure.

Referring to FIG. 2, in the various embodiments, the primary and secondary glazing 21, 23 may comprise a plurality of glazing panels. The plurality of glazing panels may include a first glazing panel 24 and a second glazing panel 26. The first glazing panel may include a first thickness 25 and the second glazing panel 26 may include a second thickness 27. In some embodiments, the second thickness 27 may be relatively greater than the first thickness 25. In other embodiments, the first thickness 25 may be relatively greater than the second thickness 27. In yet other embodiments, the first and second thicknesses 25, 27 are substantially equal. It will be recognized that any number of glazing panels may be implemented In those embodiments in which the one of the plurality of glazing panels has a greater thickness than another of the plurality of glazing panels. The glazing panels may differ in thickness by 5%, 10%, 15%, 20%, 25%, 30%, 40%, 50%, 100%, 150%, 200%, or more or any value or range between any of the foregoing ranges. The ratio of the thickness of the glazing panels may from about one tenth ($1/10$) to about nine tenths ($9/10$). In some embodiments, the plurality of glazing panels may have a ratio of thickness of about one tenth ($1/10$). In some embodiments, the plurality of glazing panels may have a ratio of thickness of about one fifth ($1/5$). In some embodiments, the plurality of glazing panels may have a ratio of thickness of about three tenths ($3/10$). In some embodiments, the plurality of glazing panels may have a ratio of thickness of about two fifths ($2/5$). In some embodiments, the plurality of glazing panels may have a ratio of thickness of about one half ($1/2$). In some embodiments, the plurality of glazing panels may have a ratio of thickness of about three fifths ($3/5$). In some embodiments, the plurality of glazing panels may have a ratio of thickness of about seven tenths ($7/10$). In some embodiments, the plurality of glazing panels may have a ratio of thickness of about four fifths ($4/5$). In some embodiments, the plurality of glazing panels may have a ratio of thickness of about nine tenths ($9/10$).

When assessing and/or demonstrating acoustic properties of fenestration units, such as any of the fenestration units 10, the method may include a variety of types of fenestration units and associated parts. For example, some methods may implement a full fenestration unit (e.g., any of the fenestration units 10) including a full frame with a sash unit including a sash maintaining a plurality of glazing panels. The full fenestration unit (e.g., fenestration unit 10) may include various accessories such as hinges, rails, screens, locks, latches, tracks, levers, blinds, restrictors, and lugs among others. In other embodiments, the fenestration unit may not include additional features such as accessories. Furthermore, the fenestration unit may be simplified to provide only portions of the fenestration unit; for example, the fenestration unit for demonstration may only include the sash unit (e.g., sash unit 18) including the sash (e.g., sash 20) and the plurality of glazing panels (e.g., glazing panels 28).

Figure 4:
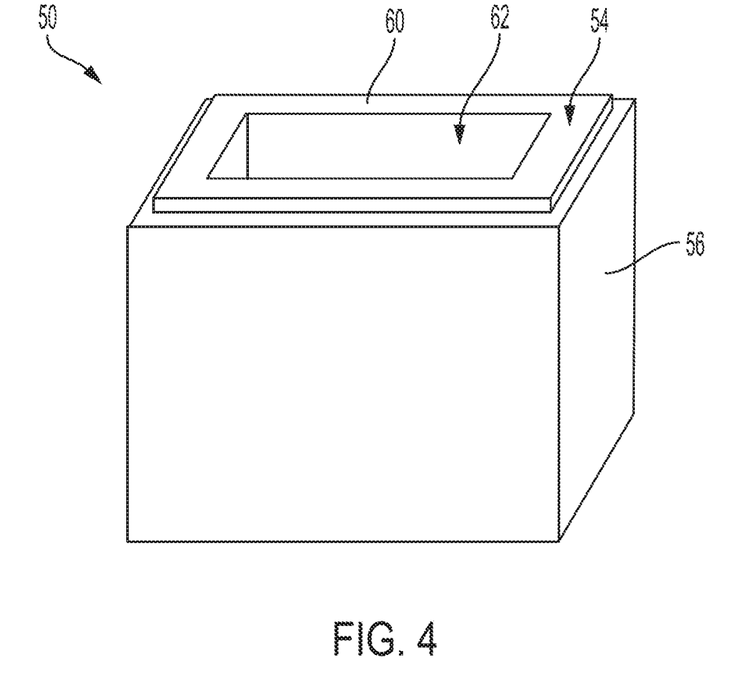
FIG. 4 is a perspective view of a sound demonstration apparatus, according to an embodiment.
Figure 5:
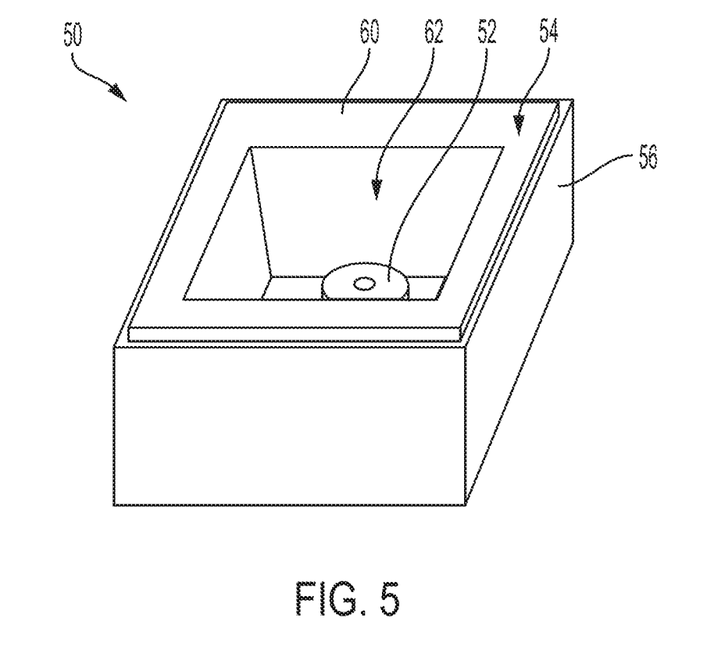
FIG. 5 is a perspective view of a sound demonstration apparatus with a sound emitting device, according to one embodiment.

In some embodiment, in order to assess and/or demonstrate the acoustic properties of a fenestration unit, such as fenestration unit 10, a demonstration apparatus may be provided. FIGS. 4-5 provide exemplary embodiments of a sound demonstration apparatus 50. The sound demonstration apparatus 50 may include a sound emitter 52 and a sound insulating member 54. The sound emitter 50 may include one of a speaker, a noise maker, a white noise machine, a fan, a clapper, a percussive device, a tuning fork, or any other device operable to produce noise. In some embodiments, the sound emitter 52 may be controlled and operated remotely (e.g., a wireless speaker). The sound emitter 52 may be operable to produce various sounds waves including, but not limited to, waves at predetermined frequencies and amplitudes, road traffic, pedestrian traffic, air traffic, music, construction, yard care, weather events, nature sounds, animal sounds, or combinations thereof.

In some embodiments, the sound insulating member 54 may substantially surround at least portions of the sound emitter 52. When the fenestration unit 10 is engaged with the sound insulating member 54, the fenestration unit 10 and the sound insulating member 54 completely surround the sound emitter 52. Thus, any sound waves produced by the sound emitter 52 are transmitted through or absorbed by the fenestration unit 10 and/or the sound insulating member 54.

In some embodiments, the sound insulating member 54 and the fenestration unit 10 form an acoustic seal between each other when engaged. Thus, the interface between the fenestration unit 10 and the sound insulating member 54 reduce or prevent sound waves from freely passing unimpeded through the unit at the position of the interface.

Figure 6:
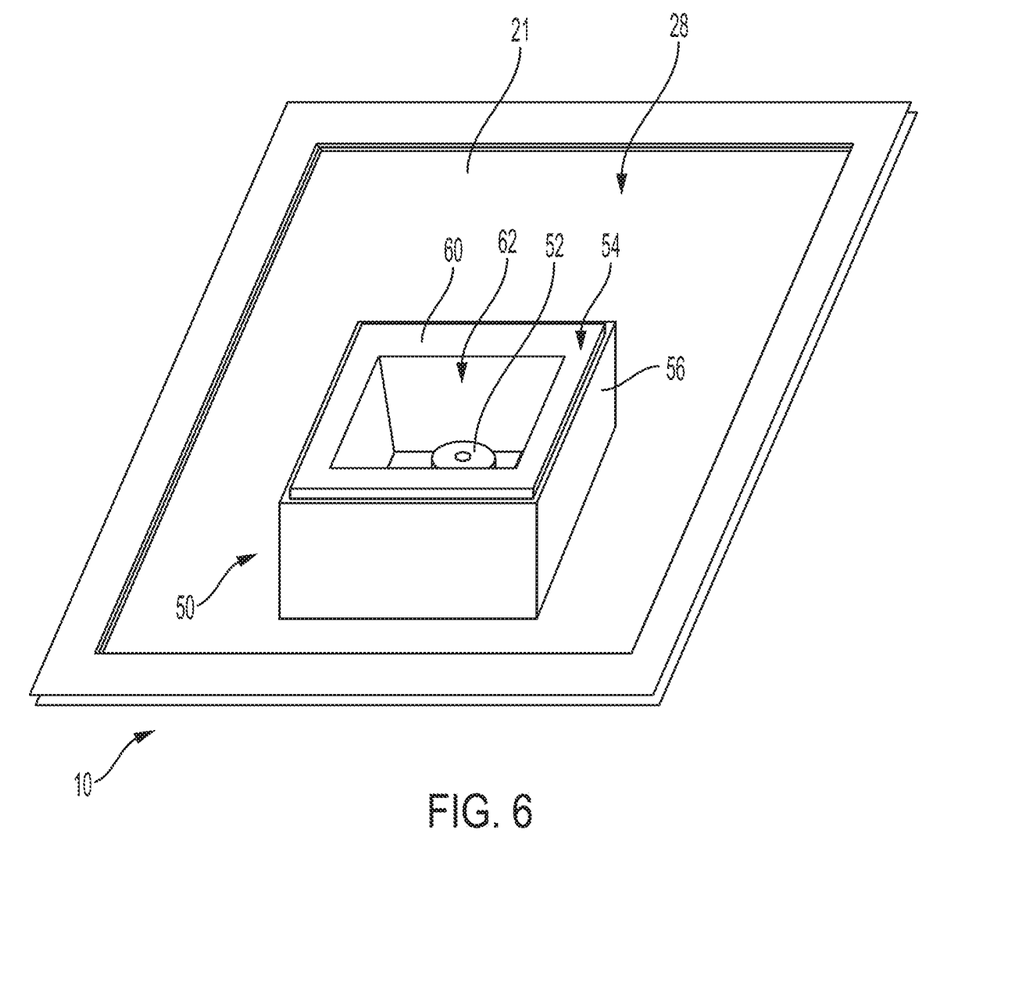
FIG. 6 is a perspective view of a sound demonstration apparatus engaged with a fenestration unit, according to one embodiment.

Referring to FIG. 6, an exemplary embodiment of a fenestration unit 10 and a sound demonstration apparatus 50 is provided. The sound demonstration apparatus 50 may comprise a semi-enclosed structure 56. In some embodiments, the semi-enclosed structure 56 includes a box with an open face. The semi-enclosed structure 56 may include a sound insulating member 54 comprising a layer of sound insulating material. The sound insulating material may comprise various materials including acoustic foams, rock wool, fiberglass insulation, fabrics, metals, fibers, plastics, mass-loaded vinyl, acoustic mineral wool, dampening compounds, and sound-proof drywall, among others. The sound insulating material may either line the interior or exterior surfaces of the semi-enclosed structure 56. For example, the semi-enclosed structure 56 may include a box with an open face. The interior surfaces of the box with an open face may be lined with a sound-absorbent synthetic foam. In some embodiments, the sound insulating material extends slightly past the open face of the semi enclosed structure 56. This provides a surface with which fenestration unit 10 may engage, thus allowing the fenestration unit 10 to directly engage with the sound insulating member 54.

In some embodiments, the fenestration unit 10 includes glazing panels 21, 23. The sound insulating member 54 may be operable to engage directly with the glazing panels 28. In these embodiments, the sound insulating member 54 includes an engagement surface 60 operable to interface with the glazing panels 28. For example, the engagement surface 60 may include an acoustic foam, rock wool, fiberglass insulation, acoustic fabric, fibers, mass-loaded vinyl, acoustic mineral wool, and dampening compounds. The engagement surface 60 may be operable to conform to a profile or surface of the glazing panel 28. In those embodiments including an open-faced box, the sound insulating member 54 may have a semi-enclosed structure 56 such as an open-faced box lined with a sound insulating material 58 on the interior surfaces of the semi-enclosed structure 56. The sound insulating material 58 (not shown) may extend past the open face 62 of the semi-enclosed structure 56. By configuring the sound insulating material 58 to extend past the semi-enclosed structure 56, portions of the sound insulating material 58 form an engagement surface 60 that is operable to directly interface with the glazing panel 28.

In yet other embodiments, the sound insulating member 54 may be operable to engage with the sash 20 of the fenestration unit 10. The sound insulating member 54 may include an engagement surface 60 operable to engage with the structure of the sash 20 of the fenestration unit 10. For example, the engagement surface 60 of the sound insulating member 54 may engage accessory channels of the sash 20, which in some embodiments results in a fixed engagement. In these embodiments, the engagement surface 60 may implement sound insulating materials to reduce or prevent transfer of noise directly from the sound insulating member 54 to the sash 20. For example, the engagement surface 60 may include a sound insulating material (e.g., sound insulating foam) formed to receive or be received by the accessory channels of the sash 20. In other examples, the engagement surface 60 of the sound insulating member 54 may engage with one of the exterior side walls of the sash 20. Thus, the sound insulating member 54 may be dimensioned and formed to correspond to the appropriate structure of the fenestration unit 10.

Figure 7A:
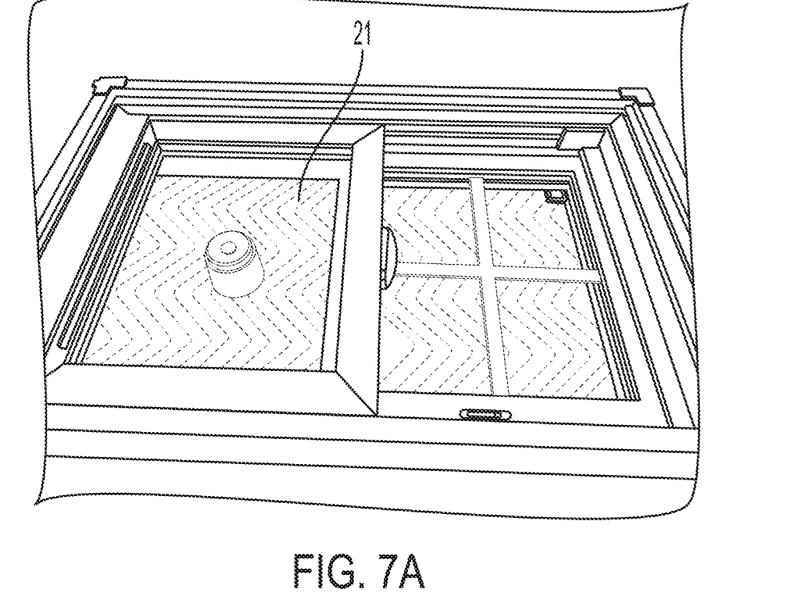
FIG. 7a is a perspective side view of a fenestration unit engaged with a sound insulating surface, according to one embodiment.
Figure 7B:
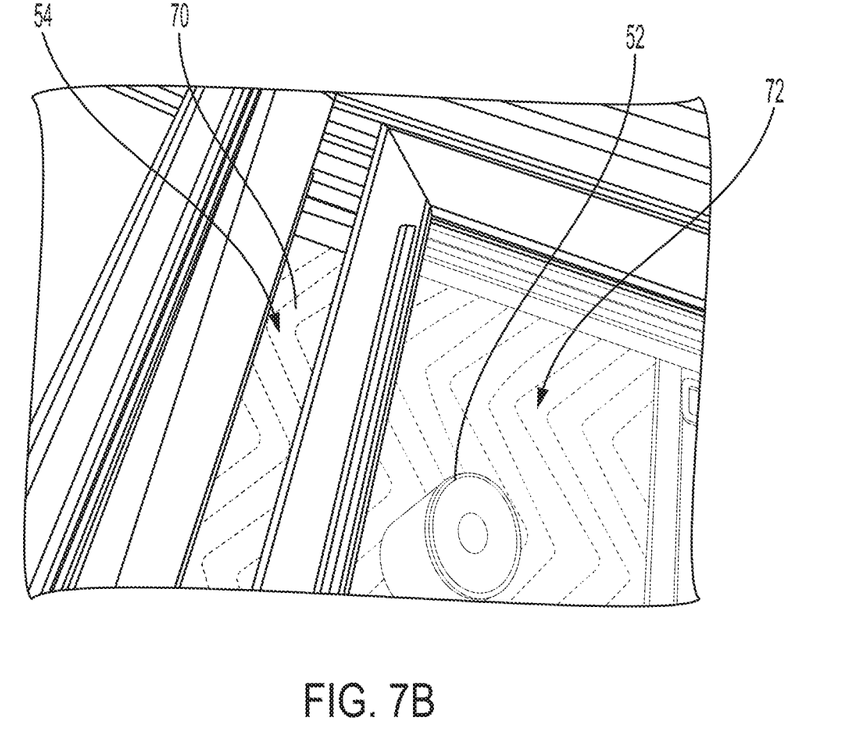
FIG. 7b is a perspective side view of a fenestration unit engaged with a sound insulating surface, wherein the fenestration unit is partially open, according to one embodiment.

Referring now to FIGS. 7a and 7b, in some embodiments, the sound insulating member 54 comprises a sound insulating surface 70. The sound insulating surface 70 may include a sound insulating material such as a carpet, a sound insulating rug, a sound insulating blanket, acoustic foams, rock wool, fiberglass insulation, fibers, plastics, mass-loaded vinyl, acoustic mineral wool, or dampening compounds, among others. The sound insulating surface 70 may include surfaces currently positioned in a space, such as rugs or carpets in a commercial or residential facility. The sound insulating surface may be operable to form at least a partial acoustic seal with the fenestration unit 10.

The sound insulating surface 70 may be implemented in conjunction with the sound emitter 52 in order to form the sound insulating member 54. When the fenestration unit 10 is positioned with the sound insulating surface 70, the fenestration unit 10 and the sound insulating surface form a cavity 72 in which the sound emitter 52 may be positioned. The sound emitter 52, as previously discussed may emit sound waves.

Demonstration Method Regarding the Acoustic Principle Implemented in Fenestration Units A method of demonstration the acoustic principles that are implemented or applied in providing sound-reducing fenestration units is provided. The method may include displaying a fenestration unit having at least a first glass panel and a second glass panel, wherein the first glass panel has a first thickness and the second glass panel has a second thickness defining a glass thickness ratio of the first glass panel relative to the second glass panel, and wherein the first panel is thinner relative to the second panel. In some embodiments, the fenestration unit may include any of the examples discussed above relating to the various fenestration units 10.

Figure 8:
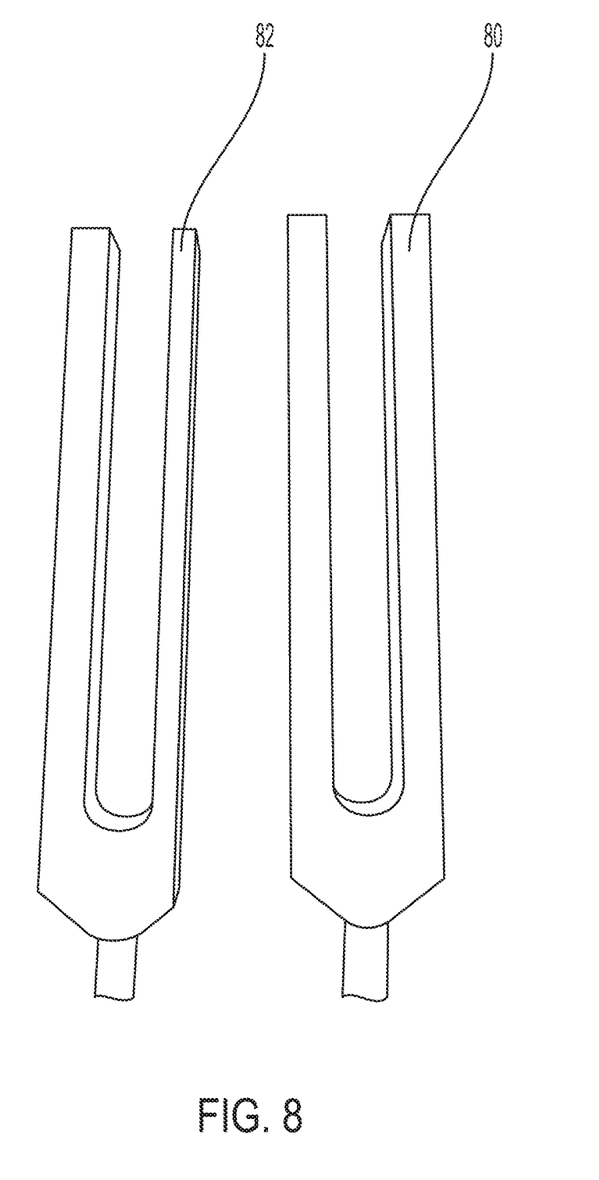
FIG. 8 is a side view of a modified and an unmodified tuning fork, according to some embodiments.

Referring to FIG. 8, the method may also include striking a first, unmodified tuning fork 80. The unmodified tuning fork represents various fenestration units in which there is only one glass panel or where there are two glass panels having the same thickness.

The method may further include striking a second, modified tuning fork 82. The modified tuning fork in some embodiments includes a first tine and a second tine, wherein the second, modified tuning fork is modified to have a tine thickness ratio equal to the glass thickness ratio. The tine thickness ratio may be defined by a first tine thickness of the first tine relative to a second tine thickness of the second tine. Thus, in those embodiments where the glass thickness ratio is about three fifths (3/5), the tine thickness ratio is three fifths (3/5). It is within the scope of the disclosure for the tine thickness ratio to substantially match the glass thickness ratio of glass, including any of the glass thickness ratios described above. The second, modified tuning form may be machined in order to provide any appropriate tine thickness ratio for the purposes of the demonstration.

The acoustic differences between the first, unmodified tuning fork may be contrasted to the second, modified tuning fork. The differences represent the acoustic differences between the fenestration units having a single glazing panel or two glazing panels having the same thickness and fenestration units implementing two glazing panels with varying thicknesses.

In some embodiments, the demonstration method includes discussing noise pollution possible, including road traffic, pedestrian traffic, air traffic, music, construction, yard care, weather events, nature sounds, or combinations thereof. The method of demonstration may also include providing an analogy the acoustic properties (e.g., level of sound reduction) of fenestration unit implementing two glazing panels (e.g., mixed-millimeter glazing) is compared to a single pane window (e.g., 2 times better, 50% of comparative sound levels and/or sound intensity). The method may further include discussing the resonance of the first, unmodified tuning fork versus the resonance of the second, modified tuning fork. The method may include discussing resonance properties of the two glazing panels which do not align and therefore reduce sound transfer through the two glazing panels.

Demonstration Method of Acoustic Properties of Fenestration Units

Turning now to a discussion of a method for demonstrating acoustic properties of a fenestration unit, a fenestration unit and a demonstration apparatus or sound insulating member may be provided. The method may include arranging the fenestration unit with the sound demonstration apparatus having a sound emitter and a sound insulating member substantially surrounding the sound emitter such that the fenestration unit is engaged with the sound insulating member and exposed to sound waves emitted from the sound emitter. The sound emitter may be arranged such that sound emitted from the sound demonstration apparatus is directed toward the fenestration unit.

The method may further include activating the sound emitter to produce sound waves such that the sound waves are directed toward the fenestration unit. In those embodiments implementing a wireless speaker or a remotely controlled sound emitter, the sound emitter may be activated remotely. The sound emitter may be controlled or operated remotely using a wireless controller. In some embodiments, the sound emitter may be first activated and then positioned with the demonstration apparatus. In some embodiments the sound emitter is a speaker or tuning forks. When the sound emitter is a speaker or a tuning fork, the method may include activating the speaker or tuning forks of the sound demonstration unit. The step of activating the speaker or tuning forks can include emitting sound waves at predetermined frequencies. When the sound emitter is a speaker, the speaker may be operable to produce sounds imitating one or more of road traffic, pedestrian traffic, air traffic, music, construction, yard care, weather events, nature sounds, or combinations thereof.

The method may further include altering the level of sound passing through or by the fenestration unit. In some embodiments, this may include opening and closing the fenestration unit such that the acoustic seal or interface between the demonstration apparatus and the fenestration unit is not disrupted. For example, a fenestration unit that is operable to slide, pivot, or otherwise open may be opened in order for sound to pass through the opening of the fenestration unit. Because the fenestration unit is operable to be opened and closed, the sound emitter may be controlled manually while in the cavity and even inserted into the cavity while the fenestration unit and the demonstration apparatus are engaged with each other.

In other embodiments, this may include displacing the demonstration apparatus and/or the fenestration unit relative to the other. The displacement would result in the disruption of the acoustic seal or interface between the demonstration apparatus and the fenestration unit. For example, when the demonstration unit comprises a sound insulating surface onto which the fenestration unit is placed, the fenestration unit may be manipulated to disrupt the interface between the sound insulating surface and the fenestration unit.

Figure 9:
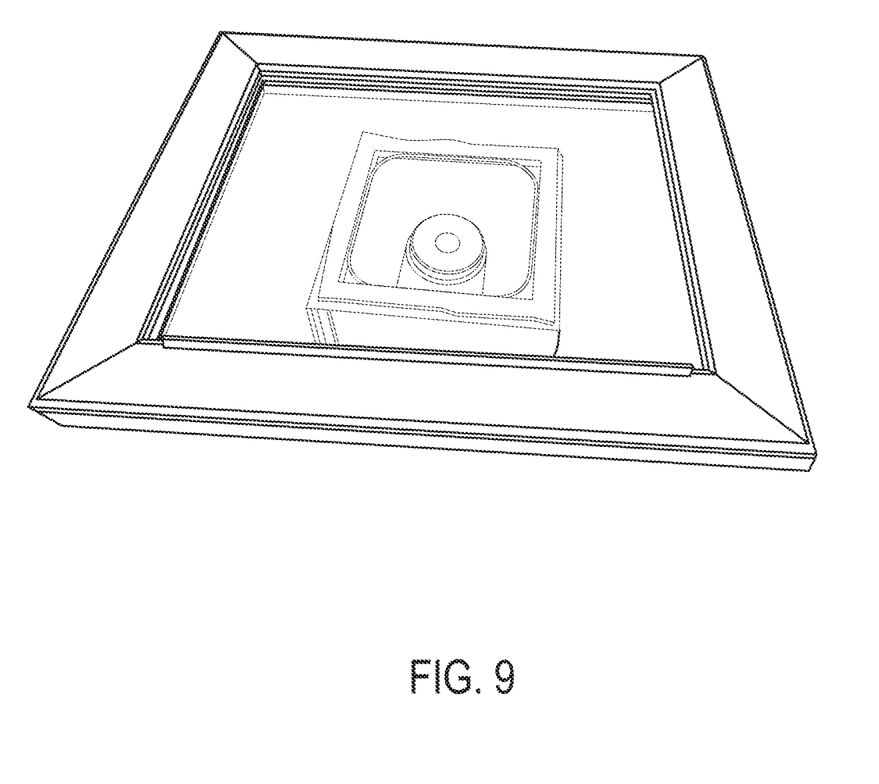
FIG. 9 is a perspective side view of a fenestration unit engaging a sound demonstration apparatus, according to one method.

As various sound demonstration apparatuses are contemplated herein, examples methods will be provided. In one example, a fenestration unit may be positioned with a sound demonstration apparatus. Referring to FIG. 9, the sound demonstration apparatus includes a semi-enclosed structure, wherein the interior walls are lined with a sound insulating material. The sound insulating material extends beyond an open face of the semi-enclosed structure. The portion of the sound insulating material extending beyond may be considered an engagement portion or surface. When the fenestration unit and the sound demonstration apparatus are arranged with one another, the fenestration unit is positioned with the semi-enclosed structure to form a cavity, such that the cavity is enclosed by the combination of the fenestration unit and the sound demonstration apparatus. Thus, the method includes forming a cavity with the sound demonstration apparatus and the fenestration unit by arranging the two components.

The fenestration unit is engaged directly by the sound insulating material at the engagement portion or surface of the sound insulating material extending beyond the open face. The method includes arranging the fenestration unit with the sound demonstration apparatus such that the engagement surface of the sound demonstration apparatus contacts the fenestration unit. In some embodiments, the engagement surface may be arranged to contact or be positioned against the glazing panels. In other embodiments, the engagement surface may be arranged to contact or be positioned against the sash and/or frame.

In this example, the cavity formed by the fenestration unit and the demonstration apparatus is accessed either by repositioning the fenestration unit and/or demonstration apparatus relative to each other, or the fenestration unit may be accessed by opening the fenestration unit. This is done by pivoting or sliding the sash relative to the frame. The cavity may be accessed in order to position or activate a sound emitter. The cavity may also be accessed in order to demonstrate the sound insulating characteristics of the fenestration unit. By manipulating the fenestration unit and/or sound demonstration apparatus such that the cavity is configured to and from a fully enclosed and a partially enclosed configuration, the sound qualities and levels may be compared and contrasted as the sound is impeded by the fenestration unit and as the sound travels unimpeded.

Referring to FIG. 7a, in another example, the fenestration unit is positioned relative to a sound insulating surface. In this method, the fenestration unit is positioned against the sound insulating surface to form a cavity. The fenestration unit may be positioned horizontally over the sound insulating surface when the sound insulating surface is horizontal, or vertically when the sound insulating surface is vertical. The fenestration unit and the sound insulating surface are positioned such that the interface between the two forms an at least partial acoustic seal. Thus, the fenestration unit and the sound insulating surface form an at least partially acoustically sealed cavity. The cavity may be accessed by similarly opening the fenestration unit as discussed above and as seen in FIG. 7b, or by repositioning the fenestration unit and/or sound insulating surface such that the cavity formed by the two is accessible. Thus, the user may position a sound emitter in between the fenestration unit and the sound insulating surface and contrast the sound qualities and levels when the fenestration unit is impeding the sound waves and when the fenestration unit is not impeding the sound waves.

The method may also include implementing the methods discussed for acquiring specification or test data. For example, the method may further comprise measuring the decibel or other sound characteristics being emitted from the sound emitter, either when a fenestration unit is engaged with and not engaged with the sound demonstration apparatus. The method may include contrasting the sound characteristics or acoustic performance (i.e., decibel level when blocked and unblocked by fenestration unit) when the methods discussed above are implemented with a fenestration unit.

The method may also include comparing and/or contrasting various sound characteristics or relative acoustic properties (i.e., sound dampening) of various fenestration units. For example, the method may include implementing the disclosed methods with a plurality of fenestration units having varying acoustic properties. For example, various fenestration units may have a single glazing panel, multiple glazing panels, glazing panels of varying thicknesses or resonance, fenestration units implementing varying materials, and so forth. The method may be used to demonstrate the advantages and disadvantages of certain fenestration units and/or configurations with regards to acoustic properties. In one embodiment, two fenestration units may be located proximate each other. Each of the two fenestration units may be paired with a separate sound demonstration apparatus or with the same sound demonstration apparatus. The methods disclosed above may be implemented on each of the fenestration units where either an observer or apparatuses may observe and/or collect data relating to the relative acoustic performance of each of the fenestration units. The method is not limited to the implementation of two fenestration units.

Furthermore, the method may include comparing a plurality of windows or performing the method on a plurality of windows in succession to provide relative acoustic performance information. The method may be performed on a variety of fenestration units implementing varying characteristics for testing performance of the variety of fenestration units and characteristics. The method may also be implemented on various fenestration units implementing similar or the same characteristics for testing performance of the fenestration units. For example, the method may be implemented as a quality control of fenestration units.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

The following is claimed:

1. A method of demonstrating acoustic properties of a fenestration unit, the method comprising:
    arranging a fenestration unit with a sound demonstration apparatus having a sound emitter and a sound insulating member, the fenestration unit and the sound demonstration apparatus fully enclosing the sound emitter such that the fenestration unit is engaged with the sound insulating member and exposed to sound waves emitted from the sound emitter; and
    activating the sound emitter to produce sound waves such that the sound waves are directed toward the fenestration unit.

2. The method of claim 1, further comprising altering the level of sound passing through the fenestration unit by opening or closing the fenestration unit.

3. The method of claim 1, wherein the sound emitter is a speaker or tuning forks and activating the sound demonstration apparatus includes activating the speaker or tuning forks of the sound demonstration unit.

4. The method of claim 3, wherein activating the speaker or tuning forks includes emitting sound waves at predetermined frequencies.

5. The method of claim 3, wherein activating the speaker includes emitting sound waves imitating one or more of road traffic, pedestrian traffic, air traffic, music, construction, yard care, weather events, nature sounds, or combinations thereof.

6. The method of claim 1, wherein activating the sound demonstration apparatus includes operating the sound emitter using a wireless controller.

7. The method of claim 1, further comprising activating the sound emitter of the sound demonstration apparatus prior to arranging the fenestration unit with the sound demonstration apparatus.

8. The method of claim 1, further comprising activating the sound emitter of the sound demonstration apparatus when the fenestration unit is in the open position.

9. A method of demonstrating acoustic properties of a fenestration unit, the method comprising:
    positioning a sound demonstration apparatus and a fenestration unit such that the sound demonstration apparatus is operatively engaged with the fenestration unit, the sound demonstration apparatus including a sound emitter and a sound insulating member, the sound emitter being enclosed between the fenestration unit and the sound insulating member when the sound demonstration apparatus is operatively engaged with the fenestration unit such that the fenestration unit and the sound demonstration unit completely surround the sound emitter such that sound emitted from the sound demonstration apparatus is directed toward the fenestration unit;
    forming an acoustic seal between the sound demonstration apparatus and the fenestration unit; and
    activating the sound demonstration apparatus such that the sound demonstration apparatus emits sound waves.

10. The method of claim 9, further comprising disrupting the acoustic seal between the sound demonstration apparatus and the fenestration unit.

11. The method of claim 9, wherein positioning the sound demonstration apparatus and the fenestration unit includes arranging the fenestration unit horizontally over the sound demonstration unit.

12. The method of claim 9, wherein activating the sound demonstration apparatus includes activating a sound emitter of the sound demonstration unit.

13. The method of claim 12, wherein activating the sound emitter includes emitting sound waves at predetermined frequencies.

14. The method of claim 12, wherein activating the sound emitter includes emitting sound waves imitating one or more of road traffic, pedestrian traffic, air traffic, music, construction, yard care, weather events, nature sounds, or combinations thereof.

15. The method of claim 9, wherein activating the sound demonstration includes operating the sound emitter using a wireless controller.

16. The method of claim 9, further comprising activating the sound emitter of the sound demonstration apparatus prior to positioning the sound demonstration apparatus and the fenestration unit.

17. The method of claim 9, further comprising reducing sound waves emanating from closed faces of the sound demonstration apparatus by providing sound insulation to the closed faces of the sound demonstration apparatus.

18. A method of demonstrating acoustic properties of a fenestration unit, the method comprising:
arranging a sound emitter on an acoustically non-transmissive surface;
activating the sound emitter; and
placing the fenestration unit over the sound emitter such that the sound emitter is enclosed by the fenestration unit and the acoustically non-transmissive surface.

19. The method of claim 18, further comprising altering the level of sound passing through the fenestration unit by opening or closing the fenestration unit.

20. The method of claim 18, wherein arranging the fenestration unit over the sound emitter includes laying the fenestration unit horizontally over the sound source position on a ground surface including an acoustically non-transmissive surface comprising carpet.

21. A method of demonstrating acoustic principles of a fenestration unit, the method comprising:
displaying a fenestration unit having at least a first glass panel and a second glass panel, wherein the first glass panel has a first thickness and the second glass panel has a second thickness defining a glass thickness ratio of the first glass panel relative to the second glass panel, and wherein the first panel is thinner relative to the second panel;
striking a first, unmodified tuning fork; and
striking a second, modified tuning fork having a first tine and a second tine, wherein the second, modified tuning fork is modified to have a tine thickness ratio equal to the glass thickness ratio, and wherein the tine thickness ratio is defined by a first tine thickness of the first tine relative to a second tine thickness of the second tine.

22. A system for demonstrating acoustic properties of a fenestration unit, the system comprising:
a sound demonstration apparatus including a sound insulating member defining an acoustic chamber, wherein the sound demonstration apparatus includes a single, open face; and
a sound emitter operable to be positioned in the acoustic chamber of the sound demonstration apparatus,
wherein the sound demonstration apparatus is operable to engage the fenestration unit at the single, open face of the sound demonstration apparatus.

23. The system of claim 22, wherein the sound demonstration apparatus includes a receiving surface operable to form an acoustic seal with the fenestration unit.

24. The system of claim 23, wherein the receiving surface of the sound demonstration apparatus is operable to abut a glass panel of the fenestration unit.

25. The system of claim 23, wherein the receiving surface of the sound demonstration apparatus is operable to engage with a frame of the fenestration unit.

26. The system of claim 22, wherein the sound emitter includes a speaker.

* * * * *